(12) United States Patent
Watanabe et al.

(10) Patent No.: US 12,055,219 B2
(45) Date of Patent: *Aug. 6, 2024

(54) HYDROGENATED NBR COMPOSITION

(71) Applicant: NOK CORPORATION, Tokyo (JP)

(72) Inventors: Isao Watanabe, Kanagawa (JP); Daiki Takekawa, Kanagawa (JP)

(73) Assignee: NOK CORPORATION, Tokyo (JP)

( * ) Notice: Subject to any disclaimer, the term of this patent is extended or adjusted under 35 U.S.C. 154(b) by 226 days.

This patent is subject to a terminal disclaimer.

(21) Appl. No.: 17/431,588

(22) PCT Filed: Feb. 13, 2020

(86) PCT No.: PCT/JP2020/005543
§ 371 (c)(1),
(2) Date: Aug. 17, 2021

(87) PCT Pub. No.: WO2020/175151
PCT Pub. Date: Sep. 3, 2020

(65) Prior Publication Data
US 2022/0136603 A1 May 5, 2022

(30) Foreign Application Priority Data

Feb. 27, 2019 (JP) ................. 2019-034766

(51) Int. Cl.
F16J 15/08 (2006.01)
B05D 7/00 (2006.01)
C08L 9/02 (2006.01)
C08L 15/00 (2006.01)
C09J 7/28 (2018.01)
C09J 7/50 (2018.01)
C09J 163/00 (2006.01)

(52) U.S. Cl.
CPC .......... *F16J 15/0825* (2013.01); *B05D 7/586* (2013.01); *C08L 9/02* (2013.01); *C08L 15/005* (2013.01); *C09J 7/28* (2018.01); *C09J 7/50* (2018.01); *C09J 163/00* (2013.01); *C08L 2312/00* (2013.01)

(58) Field of Classification Search
CPC . C08L 15/005; C08L 9/02; C08K 2003/2241; F16J 15/0825
See application file for complete search history.

(56) References Cited

U.S. PATENT DOCUMENTS

| 6,214,922 B1* | 4/2001 | Campomizzi | C08K 5/29 |
| | | | 524/495 |
| 11,466,642 B2* | 10/2022 | Takekawa | C08K 3/22 |
| 2010/0261004 A1 | 10/2010 | Higashira et al. | |
| 2016/0369742 A1 | 12/2016 | Tanaka et al. | |
| 2016/0376415 A1 | 12/2016 | Kang et al. | |

FOREIGN PATENT DOCUMENTS

| CN | 102432929 A | 5/2012 |
| JP | H7-165953 A | 6/1995 |
| JP | H10-251452 A | 9/1998 |
| JP | 2008-18707 A | 1/2008 |
| JP | 2010-285611 A | 12/2010 |
| JP | 2017-14477 A | 1/2017 |
| WO | WO 2014/208113 A1 | 12/2014 |

OTHER PUBLICATIONS

COi Rubber Products, Durometer Conversion Chart (no date).*
ISR for PCT/JP2020/005543, dated Apr. 14, 2020.
IPRP for PCT/JP2020/005543, dated Sep. 10, 2021.

* cited by examiner

Primary Examiner — Kregg T Brooks
(74) Attorney, Agent, or Firm — Greenblum & Bernstein, P.L.C.

(57) ABSTRACT

A hydrogenated NBR composition comprising 30 to 200 parts by weight of titanium oxide and 1 to 8 parts by weight of magnesium oxide, based on 100 parts by weight of hydrogenated NBR. By forming a crosslinked rubber layer of the rubber composition on a metal plate, a gasket material with excellent blister resistance, whose roll kneadability is improved without reducing the rubber strength of hydrogenated NBR, is provided. Moreover, the rubber composition is effective as a rubber raw material for use in soft metal or a high hardness hydrogenated NBR material for which kneading processing is difficult.

7 Claims, No Drawings

HYDROGENATED NBR COMPOSITION

TECHNICAL FIELD

The present invention relates to a hydrogenated NBR composition. More particularly, the present invention relates to a hydrogenated NBR composition that can provide a gasket material with improved blister resistance, and that has improved roll kneadability.

BACKGROUND ART

Cylinder head gasket is a part that is obtained by laminating rubber on a metal plate and that seals between an engine and a block. When using it, water resistance is required because engine cooling water comes into contact with the gasket. If the water resistance is poor, blisters occur.

If blisters occur in the engine, the rubber material in the portion where blisters occur may peel off. If this peeling rubber material enters the cooling system, problems occur in the cooling system, leading to engine failure.

As a method of improving blister properties, it is considered to increase the amount of filler to be compounded. As the filler, calcium carbonate, talc, clay, silica, mica, wollastonite, etc., are generally used; however, none of them satisfies the blister resistance. Further, if the filler is filled too much, the rubber hardness increases to deteriorate the sealing properties.

Furthermore, fluororubber has excellent blister resistance as a rubber material; however, there is a demerit of high cost.

Patent Document 1 discloses a rubber-metal laminated gasket obtained by sequentially laminating a surface treatment agent layer, an adhesive layer and a rubber layer on a metal plate, wherein a fluorine-free titanium compound-alumina mixture is used as the surface treatment layer and LLC resistance under high temperature conditions is improved.

As a rubber composition that can further improve the mechanical properties while maintaining the heat resistance and abrasion resistance inherent in hydrogenated NBR, Patent Document 2 proposes a rubber composition containing nylon fine particles dispersed in a hydrogenated NBR matrix and also containing a maleic anhydride group-containing ethylene-based copolymer, wherein the composition may further contain magnesium oxide, which is capable of crosslinking the functional group-containing ethylene-based copolymer, and the magnesium oxide is used together with stearic acid. Patent Document 2 also indicates that compositions that do not contain either one of nylon fine particles and a maleic anhydride group-containing ethylene-based copolymer are regarded as comparative examples. Further, titanium oxide and the like are mentioned as examples of the filler.

In addition, Patent Document 3 indicates that the vulcanization rate is accelerated using a magnesium oxide process auxiliary agent to hydrogenated NBR and alloy hydrogenated NBR.

PRIOR ART DOCUMENT

Patent Document

Patent Document 1: WO 2014/208113 A1
Patent Document 2: JP-A-10-251452
Patent Document 3: JP-A-2017-14477
Patent Document 4: JP-A-7-165953

OUTLINE OF THE INVENTION

Problem to be Solved by the Invention

An object of the present invention is to provide an NBR composition that can provide a gasket material with excellent blister resistance, whose roll kneadability is improved without reducing the rubber strength of hydrogenated NBR.

Means for Solving the Problem

The above object of the present invention can be achieved by a hydrogenated NBR composition comprising 30 to 200 parts by weight of titanium oxide and 1 to 8 parts by weight of magnesium oxide, based on 100 parts by weight of hydrogenated NBR, and the hydrogenated NBR composition contains neither nylon fine particles nor a maleic anhydride group-containing ethylene-based copolymer.

Effect of the Invention

In addition to titanium oxide, which can improve the blister resistance of crosslinked NBR, such as cylinder head gaskets, magnesium oxide is compounded in an amount of 1 to 8 parts by weight, preferably 2 to 7 parts by weight, particularly preferably 3 to 5 parts by weight, based on 100 parts by weight of hydrogenated NBR, whereby the roll kneadability can be improved, and the processability and workability can be improved.

Unlike conventional processing aids, such as tackifiers, magnesium oxide does not cause strength reduction, and thus can improve the kneadability of rubber without lowering the characteristics required for gasket materials. Further, hydrogenated NBR also has a merit of lower cost than fluororubber.

A crosslinked rubber layer of such a rubber composition is formed on a metal plate to thereby form a gasket material. Moreover, the rubber composition of the present invention is effective as a rubber raw material for use in soft metal or a high hardness hydrogenated NBR material for which kneading processing is difficult.

EMBODIMENTS FOR CARRYING OUT THE INVENTION

For use as a gasket material, a mild steel plate, a stainless steel plate, an aluminum plate, an aluminum die casting plate, or the like is used as the metal plate. As the stainless steel plate, SUS301, SUS301H, SUS304, SUS430, or the like is used. Due to the use in gaskets, the thickness thereof is generally about 0.1 to 2 mm. At this time, the metal plate is preferably used after roughening treatment and/or alkali degreasing treatment.

A primer layer is preferably formed on the metal plate. As the primer layer, generally commercially available chemicals or known techniques can be used as they are, such as Ti/Al-based coatings, zinc phosphate coatings, iron phosphate coatings, application type chromate coatings, and inorganic coatings of compounds of metals such as vanadium, zirconium, titanium, molybdenum, tungsten, manganese, zinc, and cerium, in particular, oxides of these metals, and organic coatings such as silane, phenol resin, epoxy resin, and polyurethane. However, it is preferable to use a primer layer containing an organometallic compound having at least one or more chelate rings and an alkoxyl group, or a primer layer in which a metal oxide or silica is further added thereto, and it is more preferable to use a primer layer in which a hydrolyzed condensation product of amino group-containing alkoxysilane and vinyl group-containing alkoxysilane is added to these primer layer-forming components. The hydrolyzed condensation product can also be used alone.

Examples of the organometallic compound include organoaluminum compounds, such as ethylacetoacetate aluminum diisopropylate, aluminum tris(ethylacetoacetate), aluminum-monoacetylacetonate-bis(ethylacetoacetate), and aluminum tris(acetylacetate); organic titanium compounds, such as isopropoxytitanium bis(ethylacetoacetate), 1,3-propanedioxytitanium bis(ethylacetoacetate), diisopropoxytitanium bis(acetylacetonate), and titanium tetra(acetylacetonate); organic zirconium compounds, such as di n-buthoxyzirconium bis(acetylacetonate) and di-n-buthoxyzirconium bis(ethylacetoacetate); and the like. Preferably used is an organic titanium compound composed of a chelate ring and an alkoxyl group and represented by the general formula:

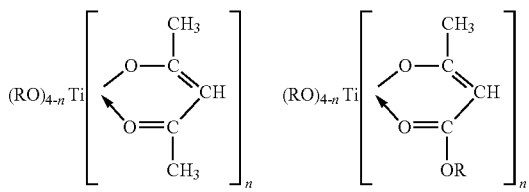

R: a lower alky group, such as $CH_3$, $C_2H_5$, $n-C_3H_7$, $i-C_3H_7$, $n-C_4H_9$, or $i-C_4H_9$ n: an integer of 1 to 4.

A surface treatment agent that forms the primer layer is applied on to the surface of the metal plate in a coating amount (basis weight) on one side of about 30 to 1,000 mg/m$^2$, preferably about 100 to 1,000 mg/m$^2$, by a method such as dipping, spraying, brushing, or roll coating, and dried at room temperature or warm air, followed by baking at about 100 to 250° C. for about 1 to 20 minutes.

Onto the primer layer applied onto the metal plate and then dried, a resin-based vulcanizing adhesive, such as a thermosetting phenol resin or an epoxy resin, is applied as an adhesive for rubber. As the thermosetting phenol resin, any thermosetting phenol resin, such as cresol novolac type phenol resin, cresol resol type phenol resin, and alkyl-modified type phenol resin, can be used. Further, as the epoxy resin, a cresol novolac type epoxy resin is preferably used. In this case, a bisphenol novolac type phenol resin is used as a curing agent, and an imidazole compound is used as a curing catalyst.

Such a resin-based vulcanizing adhesive is generally prepared as an organic solvent solution having a component concentration of about 1 to 5 wt. % using, alone or as a mixed solvent, an alcohol-based organic solvent such as methanol, ethanol or isopropanol, or a ketone-based organic solvent such as acetone, methyl ethyl ketone or methyl isobutyl ketone. The resulting organic solvent solution is applied in a basis weight (coating amount) on one side of about 100 to 2,500 mg/m$^2$ by the same coating method as for the surface treatment agent, and dried at room temperature or warm air, followed by baking at about 100 to 250° C. for about 1 to 20 minutes.

Onto the vulcanizing adhesive layer formed in this manner, an unvulcanized rubber compound is applied as a rubber compound organic solvent solution so as to form on both sides vulcanizate layers with a thickness of about 5 to 120 μm on one side.

The applied unvulcanized rubber layer is dried at room temperature to a temperature of about 100° C. for about 1 to 15 minutes to vaporize the organic solvent (e.g., alcohols such as methanol and ethanol, ketones such as methyl ethyl ketone and methyl isobutyl ketone, aromatic hydrocarbons such as toluene and xylene, or mixed solvents thereof), followed by heating vulcanization at about 150 to 230° C. for about 0.5 to 30 minutes; at that time, vulcanization is performed by applying pressure, if necessary.

As the hydrogenated NBR, one having any degree of hydrogenation is used. The hydrogenated NBR is cross-linked with an organic peroxide. Examples of the organic peroxide include tert-butyl hydroperoxide, 1,1,3,3-tetramethylbutyl hydroperoxide, p-menthane hydroperoxide, cumene hydroperoxide, diisopropylbenzene hydroperoxide, 2,5-dimethylhexane-2,5-dihydroperoxide, di-tert-butyl peroxide, dicumyl peroxide, tert-butyl cumyl peroxide, 1,1-di(tert-butylperoxy)cyclododecane, 2,2-di(tert-butylperoxy)octane, 1,1-di(tert-butylperoxy)cyclohexane, 2,5-dimethyl-2,5-di(tert-butylperoxy)hexane, 2,5-dimethyl-2,5-di(tert-butylperoxy)hexyne-3, 1,3-bis(tert-butylperoxyisopropyl)benzene, 2,5-dimethyl-2,5-di(benzolyperoxy)hexane, 1,1-di(tert-butylperoxy)-3,3,5-trimethylcyclohexane, n-butyl-4,4-di(tert-butylperoxy)valerate, benzoyl peroxide, m-toluyl peroxide, p-chlorobenzoyl peroxide, 2,4-dichlorobenzoyl peroxide, tert-butylperoxy isobutyrate, tert-butylperoxy-2-ethylhexanoate, tert-butylperoxy benzoate, tert-butylperoxy isopropyl carbonate, tert-butylperoxy allyl carbonate, and the like. The organic peroxide is used at a ratio about 0.5 to 10 parts by weight, preferably about 1 to 8 parts by weight, based on 100 parts by weight of hydrogenated NBR.

The hydrogenated NBR is compounded with, based on 100 parts by weight thereof, about 30 to 200 parts by weight, preferably about 70 to 150 parts by weight, of titanium oxide, and about 1 to 8 parts by weight, preferably about 2 to 7 parts by weight, particularly preferably about 3 to 5 parts by weight, of magnesium oxide.

The average particle size of titanium oxide is not particularly limited, and for example, one having an average particle size of about 0.15 to 0.30 μm is used. If the compounding ratio is less than this range, the effect of improving blister resistance cannot be obtained. In contrast, if the compounding ratio is more than this range, the rubber hardness becomes too high, and the sealing properties are deteriorated.

The average particle size of magnesium oxide is not particularly limited, and for example, one having an average particle size of about 1.0 to 30.0 μm is used. Further, a surface-treated product, such as a fatty acid surface-treated product, may also be used. If the compounding ratio is less than this range, the roll has poor winding properties and poor workability, and bagging on the like occurs. In contrast, if the compounding ratio is more than this range, the adhesion to the roll becomes strong, and the workability is deteriorated.

The use of other fillers, such as calcium carbonate and silica, is allowed as long as the object of the present invention is not impaired. In order to secure sealing properties, it is preferable that the D hardness measured by JIS D durometer corresponding to ISO 7619-1 is 35 or more and 65 or less.

Therefore, by compounding titanium oxide and magnesium oxide at specific ratios, the roll kneadability can be improved and the blister resistance of a cylinder head gasket etc. obtained by vulcanization molding of them can be improved. As a result, the rubber does not peel off from the gasket in the engine, and the defects are improved.

The hydrogenated NBR containing titanium oxide and magnesium oxide is formed as a crosslinked rubber layer on the metal plate. Further, when anti-adhesion is required, an anti-adhesive agent can be applied onto the surface thereof.

The anti-adhesive agent is used to prevent adhesion between rubbers or between rubber and metal. Any anti-adhesive agent that can form a coating on the vulcanized rubber layer can be used. Examples thereof include silicone-based anti-adhesive agents, fluorine-based anti-adhesive agents, graphite-based anti-adhesive agents, wax (such as amide and paraffin)-based anti-adhesive agents, polyolefin-based anti-adhesive agents, polybutadiene-based anti-adhesive agents, and the like. It is preferable to use an anti-adhesive agent comprising an organic solvent dispersion of hydroxyl group-containing liquid 1,2-polybutadiene, isocyanate group-containing 1,2-polybutadiene, and a polyolefin resin (Patent Document 4).

EXAMPLES

The following describes the present invention with reference to Examples.

Examples 1 to 8, Comparative Examples 1 to 4, and Reference Example

A Ti/Al-based primer (Ti compound: ORGATIX TC-100, produced by Matsumoto Fine Chemical Co. Ltd./Al compound: AS-520-A, produced by Nissan Chemical Corporation) was applied onto both surfaces of a degreased stainless steel plate (thickness: 0.2 mm), and baked at 200° C. for 10 minutes, thereby forming lower primer layers. An adhesive comprising an epoxy resin as a main component was applied onto the lower primer layers, and baked at 200° C. for 5 minutes to form cover coat layers. A rubber paste coating liquid was applied onto the cover coat layers, and vulcanized at 190° C. for 8 minutes to form rubber layers. A coating liquid in which wax and graphite were dispersed was applied onto the rubber layers, and baked at 200° C. for 5 minutes to form anti-adhesive layers, thereby producing a gasket material.

The rubber paste coating liquid had the following formation.

| | |
|---|---|
| Hydrogenated NBR (Therban 3446, produced by Lanxess, Inc.) | 100 parts by weight |
| Carbon black (Seast G-S, produced by Tokai Carbon Co., Ltd.) | 80 parts by weight |
| Titanium oxide (Tipaque A100, produced by Ishihara Sangyo Kaisha, Ltd.) | prescribed amount |
| Magnesium oxide (Kyowamag 150, produced by Kyowa Chemical Industry Co., Ltd., D50 particle size: 4.2 μm) | prescribed amount |
| Stearic acid (DTST, produced by Miyoshi Oil & Fat Co., Ltd.) | 1 part by weight |
| Antioxidant (Nocrac ODA, produced by Ouchi Shinko Chemical Industrial Co., Ltd.) | 2 parts by weight |
| Crosslinking aid (Taic, produced by Hitachi Chemical Co., Ltd.) | 2 parts by weight |
| Organic peroxide (Perbutyl P, produced by NOF Corporation) | 8 parts by weight |

The above components were each kneaded with a kneader and an open roll, and the obtained kneaded material (composition) was dissolved and dispersed in methyl ethyl ketone, toluene, ethyl acetate, etc., thereby preparing a rubber paste coating liquid having a solid matters content of 20 wt. %.

The produced gasket material was evaluated and measured for the following items.

D hardness: A rubber sheet having a thickness of 2 mm obtained by vulcanizing the hydrogenated NBR composition at 170° C. for 20 minutes was measured by JIS D durometer corresponding to ISO 7619-1

Tensile strength: according to JIS K6251

Roll processability:

○: Roll processability was excellent, and kneading was possible

Δ: Roll processability was slightly poor, but working was possible

X: Roll processability was poor, and working was difficult

Compression test evaluation: A donut-shaped convex mold was compressed at 250 MPa to a rubber laminate at 150° C. for 10 minutes, and then the state of the rubber layer was evaluated according to the following criteria (4 points or more were regarded as ○)

5 points: No metal was exposed, and almost no rubber flow was observed 4 points: No metal was exposed, and rubber flow was small 3 points: Not a little rubber flow occurred, but metal exposure did not occur 2 points: Rubber flow was large, but metal exposure was less 1 points: Both rubber flow and metal exposure were large The obtained results are shown in the following Tables 1 and 2. The particle size (D50 particle size) is a value measured using a Nikkiso particle size distribution analyzer "Microtrac MT3000 II" with MgO dispersed in a dispersion medium ethanol. Further, Comparative Example 1 (aliphatic $C_5$ petroleum resin, WINGTAC 95, produced by Cray Valley) and Comparative Example 2 (coumarone resin, Nitto Resin G-90, produced by Nitto Chemical Co., Ltd.) are commonly used tackifiers, and hydrogenated NBR—$TiO_2$ is added because the adhesion decreases and bagging occurs.

Magnesium oxide (Starmag U): produced by Konoshima Chemical Co., Ltd., D50 particle size: 12.4 μm Fatty acid surface-treated magnesium oxide: Starmag CX150, produced by Konoshima Chemical Co., Ltd.,

TABLE 1

| Example | 1 | 2 | 3 | 4 | 5 | 6 | 7 | 8 |
|---|---|---|---|---|---|---|---|---|
| [Additive components] | | | | | | | | |
| $TiO_2$ (Tipaque A 100) | 100 | 100 | 30 | 100 | 200 | 100 | 100 | 100 |
| MgO (Kyowamag 150) | 1 | 3 | 5 | 5 | 5 | 8 | | |

TABLE 1-continued

| Example | 1 | 2 | 3 | 4 | 5 | 6 | 7 | 8 |
|---|---|---|---|---|---|---|---|---|
| MgO (Starmag U) | | | | | | | 3 | |
| MgO (Starmag CX150) | | | | | | | | 3 |
| [Measurement results] | | | | | | | | |
| D hardness | 57 | 59 | 52 | 60 | 65 | 61 | 58 | 96 |
| Tensile strength (Mpa) | 18.1 | 18.5 | 18.7 | 18.4 | 16.5 | 18.7 | 18.5 | 18.3 |
| [Evaluation] | | | | | | | | |
| Roll processability | Δ Bagging | ○ | ○ | ○ | ○ | Δ Adhesion | ○ | ○ |
| Compression test evaluation | 5 points ○ | 5 points ○ | 4 points ○ | 5 points ○ | 5 points ○ | 5 points ○ | 5 points ○ | 5 points ○ |

TABLE 2

| Comp. Ex. | 1 | 2 | 3 | 4 | Ref. Ex. |
|---|---|---|---|---|---|
| [Additive components] | | | | | |
| TiO₂ (Tipaque A100) | 100 | 100 | 100 | 100 | 100 |
| MgO (Kyowamag 150) | | | 0.5 | 10 | — |
| Petroleum resin | 5 | | | | |
| Coumarone resin | | 5 | | | |
| [Measurement results] | | | | | |
| D hardness | 55 | 54 | 57 | 63 | 57 |
| Tensile strength (MPa) | 16.4 | 16.3 | 18.2 | 19.1 | 18.2 |
| [Evaluation] | | | | | |
| Roll processability | ○ | ○ | X Bagging | X Adhesion | X Bagging |
| Compression test evaluation | 3 points X | 3 points X | 5 points ○ | 5 points ○ | 5 points ○ |

The invention claimed is:

1. A hydrogenated NBR composition comprising 90 to 150 parts by weight of titanium oxide and 3 to 5 parts by weight of magnesium oxide, based on 100 parts by weight of hydrogenated NBR.

2. The hydrogenated NBR composition according to claim 1, wherein the composition contains neither nylon fine particles nor a maleic anhydride group-containing ethylene-based copolymer.

3. A gasket material comprising a crosslinked rubber layer of the hydrogenated NBR composition according to claim 1 on a metal plate.

4. The gasket material according to claim 3, wherein a primer layer and a resin-based vulcanizing adhesive layer are interposed between the metal plate and the crosslinked rubber layer.

5. The gasket material according to claim 3, wherein the D hardness measured by JIS D durometer corresponding to ISO 7619-1 is 35 or more and 65 or less.

6. The gasket material according to claim 5, which is used as a cylinder head gasket.

7. The gasket material according to claim 3, which is used as a cylinder head gasket.

* * * * *